United States Patent [19]

Asmuth

[11] 4,310,726
[45] Jan. 12, 1982

[54] METHOD OF IDENTIFYING A CALLING STATION AT A CALL TERMINATING FACILITY

[75] Inventor: Richard L. Asmuth, Oldbridge, N.J.

[73] Assignee: Bell Telephone Laboratories, Incorporated, Murray Hill, N.J.

[21] Appl. No.: 117,828

[22] Filed: Feb. 4, 1980

[51] Int. Cl.³ .................... H04M 3/42; H04M 7/06; H04Q 3/72
[52] U.S. Cl. .................. 179/18 B; 179/5.5; 179/18 FH
[58] Field of Search ............ 179/18 FM, 5.5, 18 B, 179/18 D, 18 C, 18 BF, 18 BC, 18 BA; 370/62, 61

[56] References Cited
U.S. PATENT DOCUMENTS

| | | | |
|---|---|---|---|
| 3,412,211 | 11/1968 | Abert et al. | 179/18 FH |
| 3,597,544 | 8/1971 | Kennedy | 179/18 C X |
| 3,641,276 | 2/1972 | Keller et al. | 179/18 BF |
| 3,881,060 | 4/1975 | Connell et al. | 179/5.5 |
| 4,162,377 | 7/1979 | Mearns | 179/18 D |
| 4,191,860 | 3/1980 | Weber | 179/18 B |

*Primary Examiner*—Thomas W. Brown
*Attorney, Agent, or Firm*—F. W. Padden

[57] ABSTRACT

A method is disclosed illustratively in an emergency call handling system for automatically providing the identity of a calling station to a call terminating facility, such as a call answering bureau. In response to an appropriate call, a data base is accessed where a fictitious telephone number is temporarily assigned to the call. The calling station identity is stored at the data base with the assigned number. The call is completed over conventional facilities to the call terminating facility using the assigned number. In response to the call directed to the fictitious number, the data base is accessed with the fictitious number to obtain the calling station's identity.

8 Claims, 5 Drawing Figures

FIG. 5

STATION ASSIGNMENT TABLE
AREA CODE 201
OFFICE CODE 544

| | CALLING LINE NO. (40) | PRI PSAP (41) | SEC PSAP 1 (42) | SEC PSAP 2 (43) |
|---|---|---|---|---|
| 1 | | | | |
| 2 | 1010 | FNT 44 | 0 | 0 |
| 3 | 1234 | FNT 45 | FNT 46 | 0 |

FICTITIOUS NO. TABLE (FNT) 44

| | SERVICE CODE - POLICE | | |
|---|---|---|---|
| 1 | | | |
| 2 | 098-0001 | | |
| 3 | | | |
| 4 | | | |
| | 098-0010 | | |

(47) (48) (49) (50)

FICTITIOUS NO. TABLE (FNT) 45

| | SERVICE CODE - POLICE | | |
|---|---|---|---|
| 1 | | | |
| 2 | 099-0001 | | |
| 3 | 099-0002 | | |
| 4 | 099-0003 | 544-1234 | 8:02 AM |
| | 099-0010 | | |

(47) (48) (49) (50)

FICTITIOUS NO. TABLE (FNT 46)

| | SERVICE CODE - FIRE | | |
|---|---|---|---|
| 1 | | | |
| 2 | 099-0011 | | |
| 3 | 099-0012 | | |
| 4 | 099-0013 | 544-1234 | 8:03 AM |
| | 099-0020 | | |
| ACTIVITY FLAG (47) | FICTITIOUS NO. (48) | CALLING STATION ID (49) | TIME OF ASSIGNMENT (50) |

METHOD OF IDENTIFYING A CALLING STATION AT A CALL TERMINATING FACILITY

TECHNICAL FIELD

The invention relates to telephone systems in general and, in particular, to a method of providing the identification of a calling station in association with an incoming call to a call terminating facility, such as a terminating office or an emergency call answering bureau.

BACKGROUND OF THE INVENTION

As more innovative and special telephone systems and services are being offered to telephone customers, problems arise in finding economical ways of integrating the new systems and services into the existing telephone network. For example, in providing emergency telephone service, the 3-digit telepone number 911 has been designated as the public emergency number throughout the United States. When a customer dials 911, the telephone system connects the customer to a public service answering point (PSAP), which is a call terminating facility authorized to receive and respond to emergency calls for police, fire, ambulance, etc., services.

A fundamental problem with basic 911 service is that telephone office service areas do not correspond with the boundaries of municipalities (borough, town, city, county, etc.) which are the natural governmental entities for offering emergency service. A customer placing an emergency call from a station in a municipality A might be directed to a PSAP in municipality B by the serving central office. In this case, the call must be redialed by the customer using a conventional 7-digit number, or some provision must be established at the PSAP to redial or transfer the call to a PSAP serving municipality A.

This problem has been overcome by a service known as expanded 911 (E911) service in which one feature uses dedicated trunking facilities and a tandem office to route calls to the proper PSAPs. This feature is called selective routing. In E911 service, a local electronic switching office, such as an ESS No. 1, manufactured by Western Electric Company, Inc., is used as the tandem office for 911 calls to route these calls to the correct PSAP designated to serve a calling station. The correct routing is determined on the basis of the ANI (automatic number identification) number, or directory number, of a calling station generated by the serving local office. The local office, which can also be the tandem ESS office for certain stations, receives a 911 call and obtains the ANI number in a conventional manner. If the local office is an office other than the tandem office mentioned above, the office seizes a dedicated outgoing 911 trunk to the tandem office and outpulses the ANI number to the tandem office. The tandem office contains a dedicated memory which is addressed using a translation of the ANI number to determine the routing to the proper PSAP for this calling station. The tandem office routes the call via a dedicated outgoing 911 trunk to that PSAP and outpulses the ANI number to the PSAP to identify the calling station to a PSAP attendant.

The PSAP selected by the tandem office may be a primary PSAP, which means that it has been designated by the municipality to receive initially all emergency calls. An attendant at the primary PSAP may thereafter distribute the calls via the tandem office to secondary PSAPs which are authorized for administering the specific service requested by the calling customer. For example, the primary PSAP may initially receive all calls but may specifically offer only police services; individual secondary PSAPs may offer fire, ambulance, and other types of emergency services. The distribution of a call from a primary PSAP to a secondary PSAP is called selective transfer.

Although the expanded 911 system operates quite well for providing emergency services, the dedicated 911 trunks represent a substantial expense. Moreover, because of a relatively low volume of emergency traffic, these trunks are typically used at only a fraction of their capacity. A number of other practical difficulties exist with the expanded 911 systems. For example, a customer such as a child who incorrectly dials "0" for an operator rather than 911 reaches an operator who is not integrated into the E911 system. The operator must determine how to route the call by means of a manual look-up procedure. The procedure is slow and error-prone. Moreover, the selective routing memory at a tandem office represents a considerable investment which is accessible only by the tandem office. It may be desirable to provide shared access to this memory for other services.

One potential way of providing a new E911 service and overcoming the disadvantages discussed above is to use a method similar to that to be used for offering enhanced-wide-area-telephone-service (INWATS) as described in U.S. patent application Ser. No. 924,170, filed by R. P. Weber on July 13, 1978, now U.S. Pat. No. 4,191,860 of Mar. 4, 1980. The method uses a data signaling network called the CCIS (common channel interoffice signaling) system. The CCIS system interconnects telephone offices and centralized processing facilities or data bases by a data communications network primarily for the purpose of segregating telephone signaling functions from telephone voice facilities. In the enhanced INWATS method, data is stored at a centralized data base for an INWATS subscriber. The stored data includes a list of telephone numbers, each stored in conjunction with an area code or codes from which an 800-type INWATS call to the subscriber may originate. In response to receipt of an INWATS call to an 800-type INWATS number assigned to the subscriber, a telephone office having access to the CCIS system formulates and sends a data message to the data base. The message includes the INWATS number and the area code from which the call originates. At the data base, a control program searches the stored data to ascertain a telephone number designated by the subscriber to which calls from the area code in question are to be routed. The selected telephone number may depend upon various other factors, such as day of the week, time of day, etc., as well as the location of the originating station. The telephone number designated by the subscriber for the call is formulated into another data message and transmitted to the inquiring telephone office over the CCIS system; the telephone office thereafter completes the call to the telephone number in a conventional manner.

To provide E911 service, the information stored in memory in a tandem office in the conventional E911 system is stored at a centralized data base as in the enhanced INWATS system. In one embodiment, the stored information includes, for a given originating telephone office, a list of ANI line numbers in the office.

A list of telephone numbers of primary and secondary PSAPs may be stored in conjunction with each ANI number. In response to a 911 call, an originating office sends a CCIS message, including the office code and ANI number of the calling station to the data base. The data base responds with an appropriate PSAP telephone number for the calling station, and the originating office then completes the call in a conventional manner.

The above method centralizes stored information for greater accessibility and eliminates the need for dedicated trunking in providing enhanced 911 service. A major problem arises, however, in that there is no convenient way to identify a calling station automatically at the PSAP. This is a serious detriment to the provision of enhanced 911 service because of the delay and error-proneness involved in having an attendant manually obtain the information, and because calling parties sometimes hang up prematurely in an emergency situation before informing an attendant of all the information necessary to provide the needed service.

The inability to identify automatically a calling station at a PSAP arises because in a nondedicated system there is no convenient way to transmit such information over the conventional network. Even if a PSAP were equipped with access to the CCIS system and the calling station identity transmitted thereby to the PSAP, there is no way for the PSAP to associate the identity with a call arriving on an incoming trunk unless all offices involved in the connection and the PSAP have CCIS capability. If all offices and PSAPs have CCIS capability, the incoming trunk to the PSAP can be provided with the calling station identity to the PSAP via the CCIS system. It is likely to be many years before all offices have CCIS capability.

SUMMARY OF THE INVENTION

The invention solves the foregoing problem, and a technical advance is achieved in a method of identifying a calling station to a call terminating facility.

A fictitious telephone number is assigned to a call directed to the facility in response to receipt of the call at a telephone office. The fictitious number is stored in conjunction with the identity of the calling station. Thereafter, the call is forwarded to the facility using the fictitious number. When a call directed to a fictitious number is received at the facility, the facility uses the fictitious number to obtain the identity of the calling station from storage by means of a data network between the facility and the telephone office.

In a preferred embodiment, the storage is located at a centralized data base, and a data communications network interconnects the telephone office, terminating facility, and data base. The calling station identity is forwarded over the network to the data base where the fictitious number is assigned and stored in conjunction with the calling station identity. The fictitious number is returned to the telephone office via the network, and the call is then forwarded to the facility using the fictitious number.

In response to a call directed to a fictitious number, the facility transmits the fictitious number via the network to the data base where the number is used to locate the calling station identity in storage. The identity is then returned to the facility via the network.

In the preferred embodiment, a pool of idle fictitious numbers is maintained at the data base. One of the fictitious numbers is assigned to each call request by removing it from the pool. An assigned fictitious number is returned to the pool as soon as the call to which it is assigned is received at the facility and the calling station identity identified at the data base.

Although the call terminating facility may be a telephone office or other facility, it is a primary or secondary PSAP in the preferred embodiment. A list of stations served by an originating telephone office is maintained at the data base. For each station entry in the list, an indication is stored of a primary PSAP designated to receive initially calls of a prescribed type from the station. A second indication of one or more secondary PSAPs may also be stored with each station entry of the list if a secondary PSAp applies to the station in question. A different pool of fictitious numbers is maintained at the data base for each PSAP although a common pool could be provided, if desired.

After a call is completed to a primary PSAP and the calling station identified at the PSAP in accordance with the invention, the calling station identity is transmitted from the primary PSAP to the data base responsive to a signal from an attendant at the primary PSAP to transfer the call to a secondary PSAP. In accordance with the invention for providing the identity of the calling station to the secondary PSAP, the data base assigns a second fictitious number to the call from the appropriate pool and stores the calling station identity in conjunction with the second fictitious number. The second fictitious number is returned to the primary PSAP where a second call is initiated to the secondary facility using the second fictitious number.

In response to receipt of the call at the secondary PSAP, the second fictitious number is transmitted to the data base where the calling station identity is ascertained using the second fictitious number and returned to the secondary PSAP.

BRIEF DESCRIPTION OF THE DRAWINGS

In the drawings,

FIG. 2 through 4 contain flow diagrams of a program for controlling a processor at the data base of FIG. 1 illustratively for determining the routing of 911 calls and for providing the identification of a calling station to a PSAP in accordance with the invention; and FIG. 5 shows illustrative memory table layouts for use with the flow diagrams of FIG. 2 through 5.

DETAILED DESCRIPTION

Figure 1:
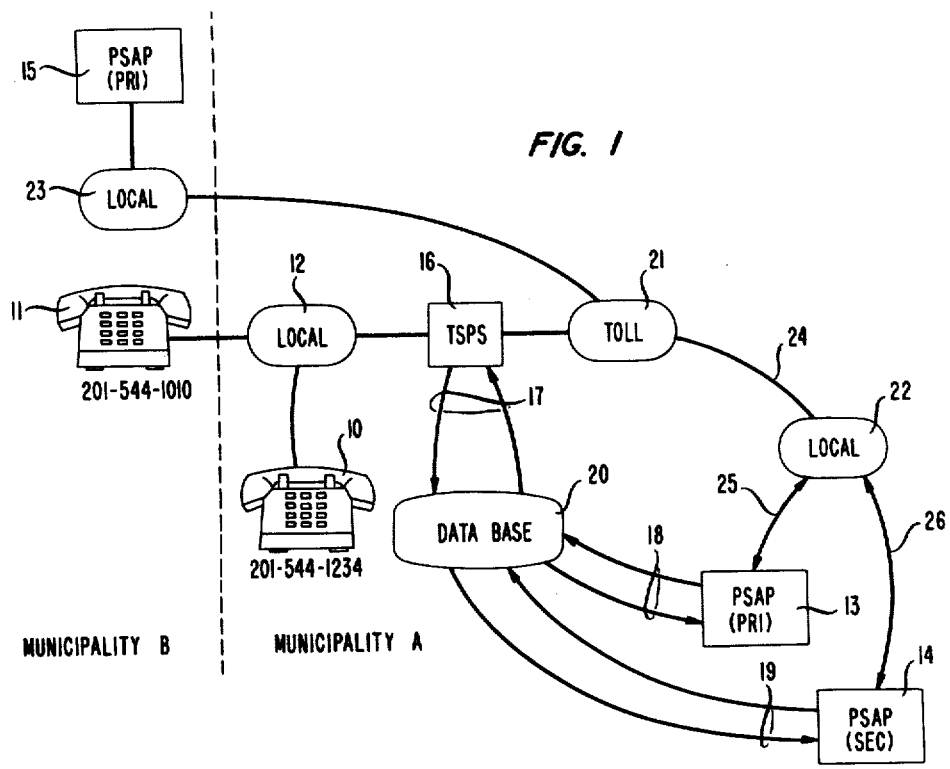
FIG. 1 shows, in block diagram form, a plurality of representative stations, telephone switching offices, PSAPs, and CCIS facilities including a centralized data base illustratively for providing expanded 911 service.

In the illustrative configuration of FIG. 1, two stations 10 and 11 are both served by a local central office 12. Station 10, however, is assumed to be located in a municipality A, whereas station 11 is assumed to be located in a different municipality B. Municipality A has elected to arrange its emergency services such that a primary PSAP 13 initially receives all 911 calls and specifically serves calls for police services. All other emergency calls are transferred from PSAP 13 to a secondary PSAP 14 for service.

Municipality B, on the other hand, is served by only a single primary PSAP 15 which handles emergency 911 calls of all types from its residents.

A PSAP typically comprises one or more attendant positions served by an appropriate automatic call distributed (ACD) or key system. Each position is supplemented with a display device for displaying the identity of a calling station and other information. A microprocessor subsystem is integrated into the structure for controlling such functions as attachment of receivers, return of tones, etc., and for monitoring the call connecting functions of the ACD or key systems. Such arrangements are commercially available from telephone companies.

Local office 12 is assumed to have access to a traffic service position system (TSPS) 16 which, in turn, is assumed to have access to the CCIS system. For purposes of FIG. 1, the CCIS system comprises data links 17, 18, 19, and a centralized data base 20.

A TSPS such as 16 is an operator and automatic facility described in detail in U.S. Pat. Nos. 3,484,560 to Jaeger et al., issued on Dec. 16, 1969; 4,031,324 to Dudonis issued on June 21, 1977; and 4,054,756 to Comella et al. issued on Oct. 18, 1977. It comprises a processor, memory, software program, switching network, and other equipment for automatically handling certain types of calls. It also interfaces callers with operator positions for semi-automatic handling of calls which require operator assistance.

The data links 17, 18, 19, and data base 20 of the CCIS system illustratively form a packet data switching arrangement. Packet data switching facilities are disclosed, for example, in A. G. Fraser, U.S. Pat. Nos. 3,749,845 of July 31, 1973, and 3,979,733 of Sept. 7, 1976. The structure and operations of the CCIS system are described in the 57 *Bell System Technical Journal,* No. 2, page 230 et seq.

Data base 20, by way of example, may comprise a Western Electric Company, Inc., 1A processor (disclosed in 56 *Bell System Technical Journal,* No. 7, February 1977), equipped with disc storage and a system of programs to establish, edit, interpret, and manage information stored in memory. It is equipped via a peripheral unit bus (disclosed in 57 *Bell System Technical Journal,* No. 2, February 1978) with facilities for interface communication via the data links with other portions of the CCIS system.

Also shown in FIG. 1 is a toll office 21 which, by way of example, is assumed to interconnect TSPS 16 with a local office 22 which, in turn, interconnects by trunks with the PSAPs 13 and 14. Toll office 21 also interconnects TSPS 16 with local office 23 which serves PSAP 15 in municipality B. Local office 22 is assumed to be an electronic switching system (ESS) type of office, such as an ESS 1, 2, 3, 5, manufactured by Western Electric Company, Inc., so that calls may be conveniently transferred from a primary PSAP to a secondary PSAP as will be described further.

In order to explain the operation of my invention, it is assumed that a calling party at station 10 initiates a 911 call in response to a fire, for example, at his home. In response to the call, local office 12 recognizes the digits 911 and responds by seizing an outgoing trunk to TSPS 16. At the appropriate time local office 12 outpulses the 911 digits to TSPS 16 in response to a signal that the TSPS is ready to receive the digits. Local office 12 also identifies the directory number of station 10 in a conventional manner by means of its automatic number identification (ANI) equipment and outpulses the number to TSPS 16. TSPS 16 determines the area code of the calling station 10 by means of the trunk group on which the call arrives and appends it to the station number. TSPS 16 also recognizes the digits 911 as requesting emergency service and, in response, formulates and transmits a data message including a message identification code, the called digits 911, and the complete calling station 10 number 201-544-1234 to data base 20 via data link 17.

Data base 20 receives the message from TSPS 16 and, in response to the 911 digits, executes the program at program address EC1 in FIG. 2. The ANI number 201-544-1234 is an input parameter to the program. At block 60 of FIG. 2, the program first translates the area code 201 and the office code 544 of the ANI number into an address of a memory table referred to herein as the station assignment table. An illustrative station assignment table for office 12 is shown in FIG. 5. Each office whose 911 records are maintained at data base 20 would have a similar table for each of its office codes.

In FIG. 5 each word, such as 1, 2, and 3, of the station assignment table is associated with a station served by the office affiliated with the table, and each word contains a slot 40 in which is stored the line number portion of the station number in question. For example, word 3 is assumed to be associated with station 10 and therefore contains in its entry 40 the line number digits 1234 of the station 10 number 544-1234. A second slot 41 of each word of the station assignment table contains an address of a fictitious number table (FNT) associated with a primary PSAP for the office in question. Illustrative FNTs are also shown in FIG. 5. Each word of the station assignment table may also contain a plurality of other slots such as 42 and 43, which contain memory addresses of other fictitious number tables associated with secondary PSAPs for the office in question. By way of example, slot 41 for word 3 (station 10) contains an address of an FNT 45. FNT 45 is illustratively associated with the primary PSAP 13 for municipality A. Entry 42 of word 3 contains the address of an FNT 46 associated with the secondary PSAP 14 for municipality A. Entry 43 would contain the address of an FNT associated with a second secondary PSAP if muncipality A had such a PSAP. Each word may contain slots for as many secondary PSAPs as desired. However, municipality A has only one primary and one secondary PSAP. The logic state "0" in slot 43 of word 3 of the station assignment table is used to indicate that no associated PSAP exists for that slot.

In accordance with the illustrative table format defined above, slot 41 for word 2 (station 11 in municipality B) contains the address of FNT 44 associated with primary PSAP 15. Since there are no secondary PSAPs in municipality B, the slots 42, 43, etc., each contain the state "0".

Each of the FNTs contains in its first word 1 a service code which defines the type of emergency answering bureau, or PSAP, that is associated with the FNT. For example, FNT 46 is primarily associated with the fire department of municipality A. The service code in word 1 of FNT 46 reflects this. However, as previously discussed, this PSAP has been designated by municipality A as the serving bureau for all emergency calls in the municipality other than calls for the police department.

Each of the FNTs, such as 44, 45, and 46, also contains a pool of fictitious telephone numbers. For example, FNT 45 contains the illustrative fictitious numbers 099-0001, 099-0002, etc., to 099-0010 in entries 48 of the table words. The fictitious office code 099 is arbitarily assigned to local office 22. The fictitious line numbers 0001 to 0010 of office code 099 are arbirarily assigned to the primary PSAP 13.

Similarly, FNT 46 contains a pool of fictitious numbers 099-0011 to 099-0020. Again the office code 099 is assigned to office 22, and the lines 0011 to 0020 are assigned to the secondary PSAP 14.

For local office 23 in municipality B, a different fictitious office code 098 is arbitrarily assigned. The fictitious line numbers 0001–0010 of office code 098 are assigned to PSAP 15. These fictitious numbers are contained in FNT 44. The entry 41 in word 2 of the station assignment table for station 11 in municipality B points to FNT 44.

With reference again to our example, the result of the program execution of block 60 in FIG. 2 is the address of the station assignment table in FIG. 5. The program at block 61 next searches the slots 40 of the station assignment table for the line number 1234 of calling station 10. The line number is found in word 3.

Block 62 determines if this program execution of EC1 is a result of an initial request from a caller or a selective transfer request to a secondary PSAP from another PSAP attendant. Since the request in this case is an initial one from station 10, the interrogation in block 62 is not satisfied, and block 63 is executed.

In block 63 the memory address of FNT 45 associated with the primary PSAP for station 10 is obtained from slot 41 of the station assignment table word 3. Block 64 searches FNT 45 for an idle fictitious number to assign to the call. The search may be performed in any acceptable manner. For purposes of this disclosure, however, it is assumed that the program merely examines each word of FNT 45 sequentially from the top toward the bottom until the first idle number is found. An idle number is indicated by a logic state "0" in the activity flag 47 of the word.

The first idle fictitious number found in table 45 is assumed to be 099-0003 in word 4. The activity flag of word 4 is set to "1" to mark the fictitious number busy, and the current time is stored in slot 50 of word 4. As will be described, this is used to audit the FNTs at a later time so that non-completed calls do not permanently consume the fictitious numbers. The number of station 10 is stored in slot 49 of word 4, and finally a data message is formed consisting of the message identification code present in the initial data message from TSPS 16 and the assigned fictitious number 099-0003. This data message is transmitted to TSPS 16 via data link 17, and program execution is complete. These actions are performed in blocks 65 through 67.

TSPS 16 uses the message identification code in the data message from data base 20 to identify the call records in its memory pertaining to the call from station 10. The call is forwarded in a conventional manner using the assigned fictitious number 099-0003. Translation records in intermediate offices must, of course, identify local office 22 as being associated with the fictitious office code 099 so that the call is routed to office 22. In this example, the call is routed via toll office 21. In response to the 099 office code, toll office 21 seizes an outgoing trunk 24 of a prescribed class. The class alerts local office 22 to receive a seven-digit number. The seven-digit number 099-0003 is then outpulsed to local office 22 in a conventional manner.

Figure 3:
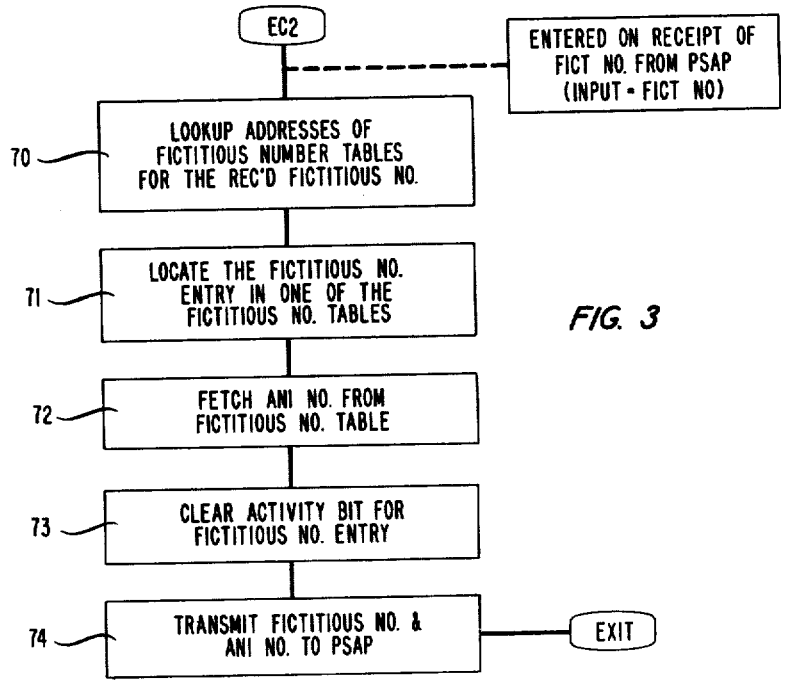

Local office 22 translates the 099-0003 digits upon receipt and determines that the call is directed to PSAP 13. A trunk 25 is seized to PSAP 13, and the fictitious line number digits 0003 are outpulsed to a receiver at the PSAP. An attendant position is seized at the PSAP in accordance with conventional practice. To determine the identity of the calling station in accordance with the invention, the microprocessor (not shown) of PSAP 13 formulates and transmits a data message comprising its assigned fictitious office code 099 and the fictitious line number 0003 to data base 20 via data link 18. The PSAP may also append the area code in question to the fictitious number if required by the data base. In response to the data message, the data base begins program execution at address EC2 in FIG. 3.

The program at EC2 determines from the received fictitious number the FNT in which the number is located. This may be performed by table look-up. The program then locates the word containing the fictitious number in the proper FNT. In accordance with this procedure the program determines that the fictitious number is in word 4 of FNT 45 in this example. The calling station identity (station number) is obtained from the associated slot 49 of word 4. The activity flag 47 is set to "0" to return the fictitious number to the pool of idle numbers. The station identity is then formulated into a data message along with the fictitious number and the data message transmitted to PSAP 13. These actions are performed in blocks 70 to 74 of FIG. 3.

In response to the data message, the identity of the calling station is displayed at the position in accordance with conventional practice. The attendant verbally determines from the caller that the call is for emergency fire service. It is recalled that fire service calls are served by PSAP 14 in municipality A. Therefore, to transfer the call to PSAP 14, the attendant depresses an appropriate key at the position associated with a fire assistance call. In response to the key depression, PSAP 13 formulates and transmits a data message to the data base 20. The message consists of an identification code identifying the message as a transfer request, the calling station identity, the position number at which the attendant is located and a service code determined by the specific button depressed.

Figure 4:
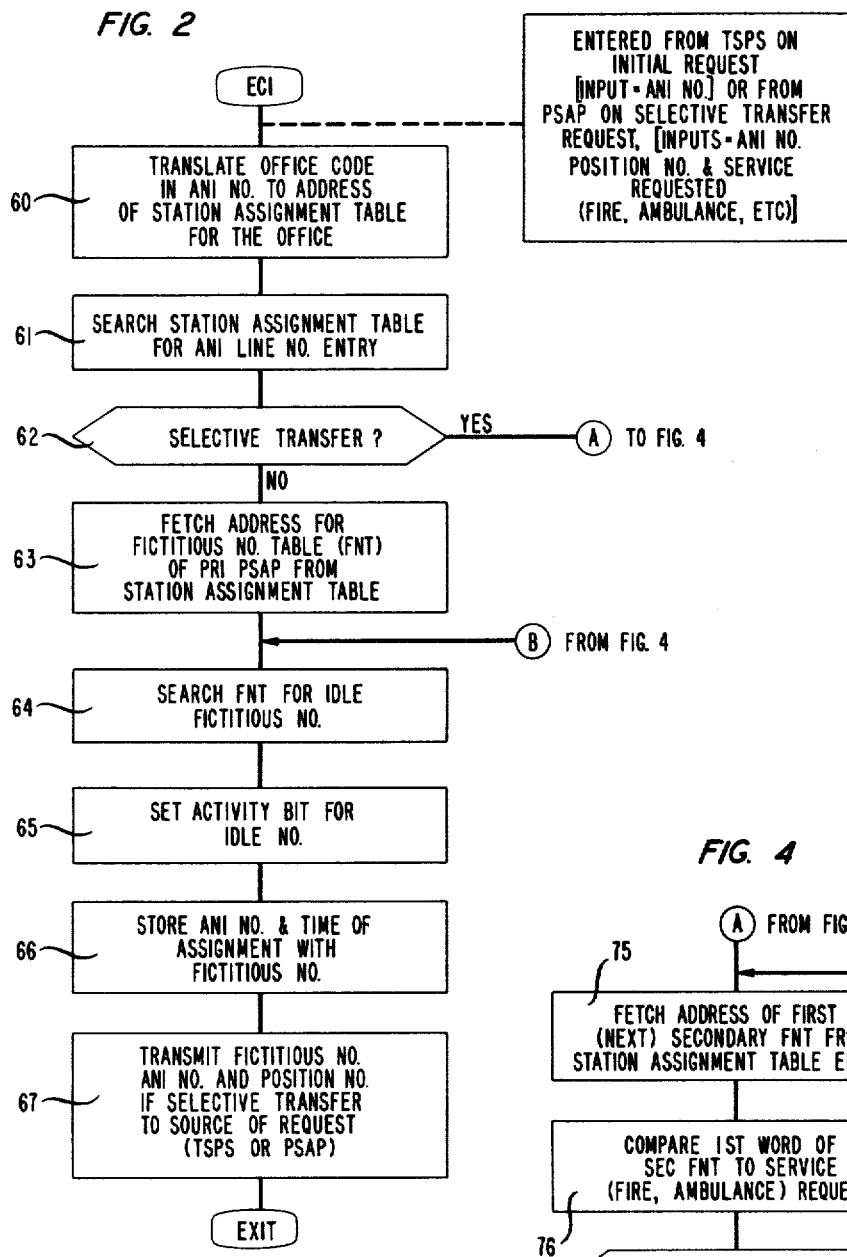

The program EC1 diagrammed in FIG. 2 is again executed in response to receipt of the transfer data message. In this case, the interrogation in block 62 as to whether or not this is a selective transfer request is successful. As a result, blocks 75 to 77 in FIG. 4 are executed. The purpose of these program blocks is to locate the proper FNT associated with a secondary PSAP for the service requested by the attendant. The program sequentially obtains the memory address of each secondary FNT from slots 42, 43, etc., of word 3 of the station assignment table. For each secondary FNT obtained, the program reads word 1 of the FNT and compares the service code received in the transfer data message to the service code stored in word 1. This process continues until a match is found. In the example at hand, only one such comparison is required since the first and only secondary FNT 46 is associated with a request for fire assistance.

After locating the proper secondary FNT, program execution continues at block 64 of FIG. 2. The remainder of the program operates in the same manner as already discussed for the initial request. At block 64, the activity flags of the secondary FNT 46 are searched for an idle fictitious manner. Assuming that the first idle fictitious number 099-0013 is located in word 4 of FNT 46, the calling station identity 544-1234 of station 10 is stored in slot 49 of word 4, and the activity flag 47 of word 4 is set to logic "1" to remove the fictitious number from the pool of idle numbers. The current time is also stored in slot 50 as already discussed. Finally, the program formulates a data message comprising the new fictitious number 099-0013, the calling station identity, and the position number of the position in the primary PSAP handling the initial request and transmits the message to the primary PSAP 13. The position number may be used by PSAP 13 to identify the call with which the message is associated, and it may also be used to direct appropriate display information to the primary attendant so that the attendant may monitor the call to insure its proper disposition.

To effect the transfer to secondary PSAP 14, PSAP 13 automatically generates a "flash" signal on the trunk 25 to local office 22. Since office 22 is illustratively an ESS type of office, the "flash" signal is interpreted by the office as a request to initiate a 3-way conference bridge connection. This is in accordance with conventional practice. In response, office 22 returns dial tone over the trunk to PSAP 13. PSAP 13 thereupon outpulses the fictitious number 099-0013 on the trunk to office 22. Office 22 translates the office code and line portion of the fictitious number to determine the routing of the call. It then seizes an outgoing trunk, such as 26 in FIG. 1, to the designated PSAP 14 and outpulses the line portion 0013 of the fictitious number via one port of the 3-way conference bridge.

PSAP 14 operates in essentially the same manner as already described for PSAP 13. In response to the digits 0013, it seizes an attendant position. It appends its fictitious office digits 099 and forms a data message which is transmitted over data link 19 to data base 20. The message causes the execution of program EC2 in FIG. 3 at the data base. As already described, EC2 locates the appropriate FNT by table look-up and then locates the specific fictitious number 099-0013 in the table. The calling station identity is obtained from slot 49 of the FNT table word associated with the fictitious number. The fictitious number is returned to the pool of idle numbers by setting the activity flag 47 in the word to "0," and the calling station identity and fictitious number are returned to PSAP 14 over data link 19. At this point PSAP 14 automatically displays the calling station identity at the position. The initial attendant at PSAP 13 may have already disconnected from the call or may now disconnect at this time if desired.

Emergency calls from station 11 in municipality B may be handled in the same manner as described above for station 10. The calls are properly routed, however, to PSAP 15 in municipality B. This is achieved by the FNT table address in slot 41 of word 2 of the station assignment table which points to FNT 44. The fictitious numbers stored in FNT 44 illustratively have an office code of 098, which is arbitrarily assigned to PSAP 15. The local office 12, TSPS 16, and toll office 21 must, of course, recognize the fictitious office code for proper routing purposes.

Other alternatives exist to the type of fictitious numbers described above for temporary assignment to calls. For example, spare (unassigned) line numbers in a terminating local office, such as 22, may be assigned as fictitious numbers to PSAPs. In response to a data message inquiry from TSPS 16 on an emergency call, an appropriate one of the spare line numbers is assigned to the call in the same manner as described above. The assigned spare line number must be outpulsed by a local office, such as 22, to a PSAP. The PSAP may then inquire of data base 20 as to the calling station identity by using the spare line digits.

One alternative to the last-mentioned embodiment is for a terminating local office, such as 22, to access data base 20 directly with the temporarily assigned spare line number to obtain the calling station identity. The local office must then outpulse the calling station identity to the PSAP via a trunk connection such as 26.

The last two alternatives have the advantage that the originating and intermediate offices do not have to perform any additional translation of fictitious numbers. The terminating local offices, such as 22, however, would have to outpulse either spare line digits or calling station digits to a PSAP. This latter operation, although straightforward and within the skill of experienced art workers, requires modification of the conventional operating characteristics of local offices.

It is to be understood that the above-described arrangements are merely illustrative of the application of the principles of the invention and that numerous other arrangements may be devised by those skilled in the art without departing from the spirit and scope of the invention.

I claim:

1. In a system comprising a telephone office, a plurality of telephone stations, a call terminating facility and a data network between the office and facility, a method of identifying a calling station to the facility, characterized by the steps of assigning a fictitious telephone number to a call directed to the call terminating facility responsive to receipt of the call at the office, storing the fictitious number in conjunction with the identity of the calling station, forwarding the call from the office to the facility using the fictitious number, and at the facility, in response to the call directed to the fictitious number, obtaining the calling station identity from storage via the data network using the fictitious number.

2. In a system comprising a plurality of telephone offices, a plurality of telephone stations, a call terminating facility, a data base, and a data communications network, a method of identifying a calling station to the facility, characterized by the steps of forwarding an identification of the calling station from one of the offices to the data base responsive to a call at said one office directed to the facility, assigning a fictitious telephone number to the call, storing the calling station identification with the fictitious number at the data base, forwarding the call from said one office to the facility using the fictitious number, at the facility, in response to the call directed to a fictitious number, forwarding the fictitious number to the data base, retrieving the calling station identification from storage at the data base using the fictitious number, and transmitting the calling station identification to the facility.

3. In a system comprising a plurality of telephone offices, a plurality of telephone stations, a call terminating facility, a data base, and a data communications network, a method of identifying a calling station to the facility, characterized by the steps of forwarding an identification of the calling station from one of the offices to the data base responsive to a call at said one office directed to the facility, assigning a fictitious telephone number to the call, storing the calling station identification with the fictitious number at the data base, forwarding the call from said one office to the facility using the fictitious number, at the facility, in response to the call directed to a fictitious number, forwarding the fictitious number to the data base, retrieving the calling station identification from storage at the data base using the fictitious number, transmitting the calling station identification to the facility, and maintaining at the data base a pool of fictitious telephone numbers assigned to the facility, and wherein the assigning step comprises the step of selecting an idle one of the fictitious numbers from the pool for assignment to the call.

4. The invention of claim 3 characterized by the step of returning said one fictitious number to the pool upon completion of the call at the facility.

5. The invention of claim 4 further comprising the step of automatically returning said one fictitious number to the pool if the call has not been completed to the facility within a prescribed period of time after its assignment.

6. In a system comprising a plurality of telephone offices, a plurality of telephone stations, a plurality of call terminating facilities, a data base, and a data communications network interconnecting the offices and facilities, a method of identifying a calling station to the facilities, characterized by the steps of maintaining at the data base a list of stations served by one of the telephone offices, storing in conjunction with each station entry in the list a first indication of one of the call terminating facilities designated to receive initially calls from the associated station, maintaiing a different pool of fictitious telephone numbers at the data base for each one of the call terminating facilities, transmitting a data message including a calling station identification to the data base responsive to a prescribed type of call at said one of the telephone offices, ascertaining from the first indication of the list a first facility designated to receive the call, assigning a fictitious number from the appropriate pool to the call, storing the calling station identification in association with the fictitious number, transmitting the assigned fictitious number to said one telephone office, completing the call from said one office to the first facility using the fictitious number, transmitting the fictitious number from the first facility to the data base, obtaining the calling station identification from storage using the fictitious number, and transmitting the calling station identification to the first facility.

7. The invention of claim 6 in which the list contains in conjunction with each station entry a second indication of a second one of the call terminating facilities to receive calls from the station and the invention further comprises the steps of transmitting the calling station identification from the first facility to the data base responsive to a signal at the first facility to transfer the call to the second facility, assigning a second fictitious telephone number to the call at the data base from the appropriate pool, storing the calling station identification at the data base in conjunction with the second fictitious number, initiating a call from the first facility to the second facility using the second fictitious number, in response to receipt of the last-mentioned call at the second facility, transmitting the second fictitious number to the data base, obtaining the calling station identification from storage at the data base using the second fictitious number, and transmitting the calling station identification to the second facility.

8. A method of obtaining calling station identification information from a data base system comprising assigning a fictitious telephone number to a call in response to a processing of said call at said data base, storing in a storage means at the data base the assigned fictitious number and the identity of a station from which said call originates, sending the fictitious number from the data base to a communication office for controlling a completion of a call connection from the calling station to a station identified with said fictitious number, retrieving said station identity from said storage means in response to a receipt of said fictitious number at said data base from said station identified with said fictitious number, and transmitting the retrieved station identity from said data base to said station identified with said fictitious number.

* * * * *